United States Patent
Cao et al.

(10) Patent No.: US 12,367,152 B2
(45) Date of Patent: Jul. 22, 2025

(54) ACCELERATING CONTAINERIZED APPLICATIONS WITH CACHING

(71) Applicant: Hewlett Packard Enterprise Development LP, Spring, TX (US)

(72) Inventors: Lianjie Cao, San Jose, CA (US); Zhen Lin, Arlington, TX (US); Faraz Ahmed, Santa Clara, CA (US); Puneet Sharma, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/477,557

(22) Filed: Sep. 29, 2023

(65) Prior Publication Data

US 2025/0110883 A1   Apr. 3, 2025

(51) Int. Cl.
   *G06F 12/0891*   (2016.01)
   *G06F 12/06*     (2006.01)

(52) U.S. Cl.
   CPC ........ *G06F 12/0891* (2013.01); *G06F 12/063* (2013.01)

(58) Field of Classification Search
   None
   See application file for complete search history.

(56) References Cited

U.S. PATENT DOCUMENTS

| | | | |
|---|---|---|---|
| 10,659,533 B1 * | 5/2020 | Zhao | G06F 12/0862 |
| 2023/0051328 A1 * | 2/2023 | Barczak | G06F 12/0873 |

OTHER PUBLICATIONS

"Cache—The Linux Kernel documentation", available online at <https://www.kernel.org/doc/html/latest/admin-guide/device-mapper/cache.html>, 2021, 6 pages.
"CNCF Survey 2020", 2020, 18 pages.
"What is Rook?", available online at <https://rook.io/>, 2023, 5 pages.
Anderson et al., "Assise: Performance and Availability via Client-local NVM in a Distributed File System", 14th USENIX Symposium on Operating Systems Design and Implementation, Nov. 4-6, 2020, 18 pages.
Fedorova et al., "Writes Hurt: Lessons in Cache Design for Optane NVRAM", 2022, 14 pages.
Github, "Open CAS Linux—Admin Guide", available online at <https://open-cas.github.io/guide_configuring.html>, 2023, 11 pages.

(Continued)

*Primary Examiner* — Baboucarr Faal
(74) *Attorney, Agent, or Firm* — Slater Matsil, LLP

(57) ABSTRACT

In certain embodiments, a computer-implemented method includes: receiving, by a caching system plugin, a request to create a persistent volume for a container application instance; configuring, by the caching system plugin, a local cache volume on a host computing device; configuring, by the caching system plugin, a remote storage volume on a remote storage device; selecting, by a policy manager of the caching system plugin, a cache policy for the container application instance; creating, by the caching system plugin and from a cache manager, a virtual block device associated with the local cache volume, the remote storage volume, and the cache policy; and providing the virtual block device for use by the container application instance as the persistent volume.

17 Claims, 5 Drawing Sheets

(56) References Cited

OTHER PUBLICATIONS

Intel Corporation, "Intel Optane Persistent Memory,", available online at <https://www.intel.com/content/www/us/en/products/docs/memory-storage/optane-persistent-memory/overview.html>, 2022, 5 pages.

Kubernetes, "Persistent Volumes", available online at <https://kubernetes.io/docs/concepts/storage/persistent-volumes/>, Sep. 15, 2023, 22 pages.

Kwon et al., "Strata: A Cross Media File System", ACM, 2017, 18 pages.

Longhorn Authors, "Longhorn—Cloud native distributed block storage for Kubernetes", available online at <https://longhorn.io/>, 2023, 3 pages.

Portworx , "Portworx Enterprise—Kubernetes Storage Platform", available online at <https://portworx.com/products/portworx-enterprise/>, 2023, 1 page.

Red Hat, "Gluster", available online <https://www.gluster.org/>, 2019, 4 pages.

Song et al., "First Responder: Persistent Memory Simultaneously as High Performance Buffer Cache and Storage", USENIX Annual Technical Conference, 2021, 16 Pages.

Wu et al., "The Storage Hierarchy is Not a Hierarchy: Optimizing Caching on Modern Storage Devices with Orthus", 19th USENIX Conference on File and Storage Technologies, 2021, 18 pages.

Xu et al., "NOVA: A Log-structured File System for Hybrid Volatile/Non-volatile Main Memories", 14th USENIX Conference on File and Storage Technologies (FAST '16), Feb. 22-25, 2016, 17 pages.

\* cited by examiner

ACCELERATING CONTAINERIZED APPLICATIONS WITH CACHING

BACKGROUND

Applications may be containerized to provide portability, flexibility, scalability, etc. Container applications are often configured with ephemeral storage, which may store data associated with a container. However, such ephemeral storage generally does not persist beyond termination of the container.

BRIEF DESCRIPTION OF THE DRAWINGS

Certain embodiments discussed herein will be described with reference to the accompanying drawings listed below. However, the accompanying drawings illustrate only certain aspects or implementations of embodiments described herein by way of example, and are not meant to limit the scope of the claims.

DETAILED DESCRIPTION OF ILLUSTRATIVE EMBODIMENTS

Figure 1:
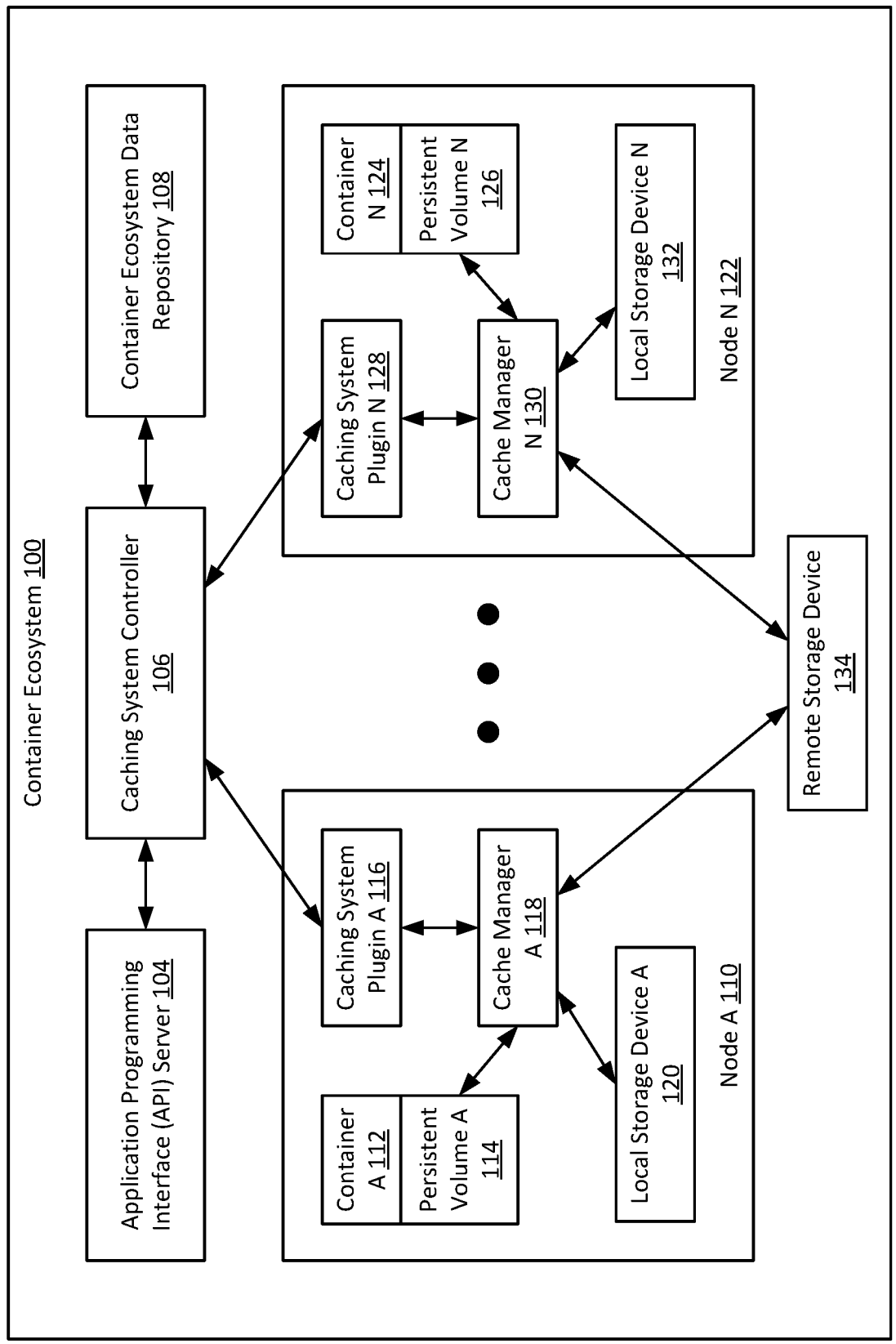
FIG. 1 illustrates a block diagram of an example system for implementing a caching framework for persistent volumes of containerized applications in accordance with one or more embodiments disclosed herein.

Compute resources (e.g., processors, network devices, storage devices, accelerators, etc.) may be used by logical instances of applications (e.g., containers). For example, containers may be deployed on host computing devices, and use a portion of the compute resources of the computing device to execute. Some containers are configured to use ephemeral storage, which may be provisioned for an instance of the container, and destroyed when the container instance is terminated. However, scenarios exist in which persistent storage may be desired for a container. Persistent storage for a container may store data that persists even after a particular instance of the container is terminated. As an example, some database applications, message broker applications, logging applications, etc. may be stateful, and thus data written by or read by an instance of a container implementing such an application may need to be persisted beyond the lifetime of a particular container instance.

Some container platforms (e.g., Kubernetes) may allow a user to specify a persistent volume for a container during container configuration. A request to create a persistent volume for a container may be received by an application programming interface (API) server executing in a control plane of the container platform. The API server may provide the request to a storage controller executing as part of the control plane of a container platform. The storage controller may then determine on what host computing device the container will be deployed, and request that a persistent volume be created on that host for the container. However, instances of a container may not always be deployed on the same host computing device, meaning that a new instance of a container deployed on a different host may not be able to access the data from the persistent volume. Alternatively, the persistent volume may be created on a remote storage device that may be accessed by any number of host computing devices in a container ecosystem (e.g., over a network) and provided to the container as a persistent volume regardless of which host an instance of the container is deployed on. However, using remote storage for a persistent volume may incur additional latency (e.g., network latency) for all reads from and writes to the persistent volume, which may negatively impact the performance of the container application.

In order to address at least the aforementioned problems with deploying containers with persistent volumes, embodiments disclosed herein provide techniques for implementing a caching framework for persistent volumes of containers.

In one or more embodiments, an entity (e.g., a user, a software entity, etc.) requests to configure a container to have a persistent volume. The request may be part of an initial configuration of a container within a container ecosystem managed by a container platform (e.g., Kubernetes), or to add a persistent volume to a container that was previously configured. The request may be received, for example, by an API server of the container platform with which the entity configuring the persistent volume interacts. In one or more embodiments, the request for a persistent volume for the container is provided from the API server to a caching system controller implemented in the control plane of the container platform and registered with the API server. In one or more embodiments, the caching system controller determines on which host computing device the container is to be deployed (or has already been deployed). In one or more embodiments, the caching system controller sends a request to a caching system plugin executing on the identified host to create a cache-enabled persistent volume for the container.

In one or more embodiments, in response to the request, the caching system plugin creates two volumes on physical storage devices. In one or more embodiments, one volume is created on a remote storage device, and the other volume is created on a local storage device of the host computing device (e.g., flash storage, persistent memory, etc.) to function as a cache for the persistent volume. In one or more embodiments, the caching system plugin then provides information about the two volumes to a cache manager (e.g., Open Cache Acceleration Software (Open CAS)) also executing on the host computing device in a request (e.g., via a command line operation) for the cache manager to create a virtual block device.

In one or more embodiments, the cache manager creates a virtual block device that encompasses the remote storage device volume and the local cache volume. In one or more embodiments, the virtual block device, and the local cache storage volume and remote storage volume associated with the virtual block device, are provided as a persistent volume for the container. In one or more embodiments, from the perspective of the entity requesting the persistent volume, the container platform, and the container, the persistent volume may be treated as a single persistent volume associated with the container.

In one or more embodiments, the caching system plugin includes a policy manager. In one or more embodiments, the policy manager is configured to select a cache policy to apply for the persistent volume. In one or more embodiments, the policy is configured to cause the cache manager executing on the host computing device to enforce a cache policy for the container. In one or more embodiments, a cache policy determines what data corresponding to a container is cached in the cache volume, and when data is evicted from the cache volume or otherwise written to the remote storage volume. A cache policy may include a cache mode (e.g., write-through, write-back, write-around, write-invalidate, write-only, pass through, etc.), a cache eviction algorithm (e.g., least recently used, least frequently used, first-in-first-out, most recently used, etc.), and a container termination plan (e.g., flush data from the cache volume to the remote storage volume upon container instance termination).

In one or more embodiments, the policy manager of the caching system plugin is configured to have access to or otherwise be able to obtain information about how a container application will likely perform I/O, such as performing more writes than reads, expected I/O patterns, etc., which may be referred to as historical data related to the container application. In one or more embodiments, when a container is being deployed for the first time, the historical data may include information that relates a type of application (e.g., a database application) to an expected I/O pattern for such an application (e.g., more writes than reads). In one or more embodiments, such information is used by the policy optimizer to select an initial cache policy for the container application instance being deployed on the host. In one or more embodiments, various types of applications implemented in container instances may be associated by default with particular cache policies. In one or more embodiments, a cache policy is enforced for the persistent volume when the persistent volume is created, and does not change for the life of the container application instance.

However, other instances of the container application, or similar container applications may be deployed over time within the container ecosystem. Thus, in one or more embodiments, the cache manager executing on the host computing system is configured to monitor the I/O patterns of containers executing on the host computing system. The I/O pattern information may be provided to the caching system plugin, and may also be provided from the caching system plugin on the host computing device to the caching system controller of the container platform. Data about I/O patterns of container instances may be added to the historical data that may be available to the policy manager(s) of caching system plugins when selecting a cache policy to apply for a persistent volume of a container instance. Thus, in one or more embodiments, over time, the historical data about I/O patterns for containers is increased, and may be used to select an appropriate cache policy for future deployments of instances of the same or similar containers on host computing devices in the container ecosystem.

In one or more embodiments, information about the virtual block device (e.g., the local volume, the remote volume, the cache policy, etc.) is provided from the cache manager to the caching system plugin. In one or more embodiments, the caching system plugin provides the information about the virtual block device to the caching system controller. The caching system controller may then store the virtual block device information as part of the configuration information for the container in a container data repository (e.g., an etcd key value store in Kubernetes).

In one or more embodiments, once the virtual block device corresponding to the local storage volume as a cache and the remote storage volume as a back-end storage volume has been created as a persistent volume for a container application instance, the container application may perform I/O operations (e.g., reads, writes, etc.) using the persistent volume. The cache manager may perform the I/O operations pursuant to the configured cache policy. In one or more embodiments, when a container application instance on a host computing device is terminated, the data in the cache for the container application instance that has not yet been committed to the remote storage may be so committed, thereby allowing the data to persist after the termination of the container application instance, which may allow other instances of the container application to access the data. In one or more embodiments, the local cache storage volume is implanted on a persistent storage device (e.g., a persistent memory device, a flash storage device, etc.), which allows data stored in the local cache volume to persist after termination of a container application instance, system failure, etc., which may not be possible, for example, if the local cache was instead implemented in a non-persistent and/or volatile memory device such as, for example, a Dynamic Random Access Memory (DRAM) device Certain embodiments of this disclosure may improve the performance of container application instances with a persistent volume by implementing a caching system to cache data on local, higher performance storage volumes and using remote storage volumes as the back-end storage for the persistent volume. One or more embodiments disclosed herein may avoid at least some of the latency associated with performing I/O operations to remote storage, while also allowing the data for a container application to persist and be available regardless of which host computing device an instance of the container application is deployed on.

FIG. 1 illustrates a block diagram of an example system for implementing a caching framework for persistent volumes of containerized applications in accordance with one or more embodiments disclosed herein. As shown in FIG. 1, the system may include a container ecosystem 100. The container ecosystem 100 may include an API server 104, a caching system controller 106, a container ecosystem data repository 108, a remote storage device 134, and any number of nodes (e.g., node A 110, node N 122). Each node may include a caching system plugin (e.g., the caching system plugin A 116 of the node A 110, the caching system plugin N 128 of the node N 122), a cache manager (e.g., the cache manager A 118 of the node A 110, the cache manager N 130 of the node N 122), a local storage device (e.g., the local storage device A 120 of the node A 110, the local storage device N 132 of the node N 122). Any number of containers may execute on a node (e.g., the container A 112 of the node A 110, the container N 124 of the node N 122). Containers may be configured with any number of persistent volumes (e.g., the persistent volume A 114 of the container A 112, the persistent volume N 126 of the container N 124). Each of these components is described below.

In one or more embodiments, the container ecosystem 100 is a collection of any number of computing devices. In one or more embodiments, as used herein, a computing device may be any single computing device, a set of computing devices, a portion of one or more computing devices, or any other physical, virtual, and/or logical grouping of computing resources. In one or more embodiments, a computing device is any device, portion of a device, or any set of devices capable of electronically processing instructions and may include, but is not limited to, any of the following: one or more processors (e.g. components that include circuitry), memory (e.g., random access memory (RAM)), input and output device(s), non-volatile storage hardware (e.g., solid-state drives (SSDs), persistent memory (Pmem) devices, hard disk drives (HDDs) (not shown)), one or more physical interfaces (e.g., network ports, storage ports), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (ISCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), an Internet of Things (IoT) device, an array of nodes of computing resources, a supercomputing device, a data center or any portion thereof, and/or any other type of computing device with the aforementioned requirements. In one or more embodiments, any or all the aforementioned examples may be combined to create a system of such devices, or may be partitioned into separate logical devices, which may collectively be referred to as a computing device. Other types of computing devices may be used without departing from the scope of embodiments described herein, such as, for example, the computing device shown in FIG. 5 and described below.

In one or more embodiments, the storage and/or memory of a computing device or system of computing devices may be and/or include one or more data repositories for storing any number of data structures storing any amount of data (e.g., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any storage and/or memory of a computing device or system of computing devices may be considered, in whole or in part, as non-transitory computer readable mediums storing software and/or firmware.

Such software and/or firmware may include instructions which, when executed by the one or more processors (not shown) and/or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods, processes, etc. of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The container ecosystem 100 may include any number of computing devices, any number of which may be collectively considered a computing device as used herein. All or any portion of the computing devices may be the same type or be different types of computing devices.

In one or more embodiments, the container ecosystem 100 is managed by a container platform (not shown), such as, for example, Kubernetes. In one or more embodiments, a container platform includes a control plane (not shown). A control plane of a container platform may include various components for managing the container ecosystem 100 (e.g., one or more API servers, controllers, schedulers, etc.). The control plane may, for example, be implemented on one or more master nodes, each of which may be a computing device (discussed above).

In one or more embodiments, the container ecosystem 100 includes the API server 104. In one or more embodiments, the API server 104 is a computing device of the container ecosystem 100, and executes in a control plane of a container platform. In one or more embodiments, the API server 104 is configured to interact with entities (e.g., users) seeking to configure aspects of the container ecosystem 100. As an example, the API server 104 may be configured to receive requests (e.g., to configure a container, to deploy a container instance, to terminate a container, to configure storage for a container, to configure networking for a container, to view information about the container ecosystem or any portion therein, etc.), and to either service the requests or provide the requests to other entities that may service the requests. Although FIG. 1 shows the container ecosystem 100 as including a single API server 104, the container ecosystem 100 may include any number of API servers without departing from the scope of embodiments disclosed herein.

In one or more embodiments, the container ecosystem 100 includes the container ecosystem data repository 108. In one or more embodiments, the container ecosystem data repository 108 is data storage of any type for storing any number of data structures storing any amount of data (e.g., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location. In one or more embodiments, the container ecosystem data repository 108 is implemented as part of a control plane of a container platform of the container ecosystem 100. As an example, the container ecosystem data repository 108 may be an etcd key value store of a Kubernetes container platform. The container ecosystem data repository 108 may be included in and/or operatively connected to the one or more master nodes implementing the control plane of the container platform or any portion thereof (e.g., the API server 104). In one or more embodiments, the container ecosystem data repository 108 is configure to store all or any portion of data of the container ecosystem (e.g., configuration data for containers, data associated with clusters, pods, etc. of a container platform, etc.). Although FIG. 1 shows the container ecosystem 100 as including a single container ecosystem data repository 108, the container ecosystem 100 may include any number of container ecosystem data repositories without departing from the scope of embodiments disclosed herein.

In one or more embodiments, the container ecosystem 100 includes the caching system controller 106. In one or more embodiments, the caching system controller 106 is any hardware, software, firmware, or any combination thereof that is configured to manage, at least in part, persistent volumes associated with containers in the container ecosystem 100. In one or more embodiments, the caching system controller 106 is all or any portion of a computing device (discussed above). In one or more embodiments, the caching system controller 106 is included in the control plane of the container platform of the container ecosystem 100. The caching system controller may be included in a computing device (e.g., one or more master nodes) that also includes all or any portion of other components of the control plane, such as, for example, the API server 104 and/or the container ecosystem data repository 108. In one or more embodiments, the caching system controller 106 is separate from and operatively connected to other components of the control plane. In one or more embodiments, the caching system controller 106 is configured to receive requests (e.g., provided by the API server 104 from an entity interacting with the API server 104) related to persistent volumes for containers in the container ecosystem 100. As an example, an entity may submit a request to the API server 104 to configure a container with a persistent volume. The API server 104 may determine that the request is related to persistent volumes, and pass the portion of the request relating to a persistent volume to the caching system controller 106 to service the request.

In one or more embodiments, the container ecosystem 100 includes any number of nodes (e.g., the node A 110, the node N 122). In one or more embodiments, a node (e.g., 110, 122) is a computing device (discussed above). In one or more embodiments, a node (e.g., 110, 122) is configured to host one or more instances of one or more containers. As an example, FIG. 1 shows the node A 110 hosting an instance of the container A 112, and the node N 1222 hosting an instance of the container N 124. Although FIG. 1 shows the container ecosystem 100 as including two nodes (110, 122), the container ecosystem 100 may include any number of nodes without departing from the scope of embodiments disclosed herein.

In one or more embodiments, a container (e.g., the container A 112, the container N 124) is an application of any type along with various dependencies of the application (e.g., libraries, runtimes, etc.) packaged together to be deployed as container instances on computing devices, such as, for example, the node A 110 and the node N 122. A container (e.g., 112, 124) may be configured by an entity (e.g., a user, a software entity, etc.). Such configuration may occur, as an example, at least in part via an interaction between an entity desiring to deploy a container and the API server 104. Additional configuration for the container may be performed by other portions of a container platform control plane, such as, for example, a network controller or the caching system controller 106. Any number of instances of a particular container may be deployed on any number of nodes in the container ecosystem 100. Although FIG. 1 shows each node (110, 122) as including a single instance of a container (112, 124), a node may include any number of instances of any number of containers without departing from the scope of embodiments disclosed herein. In one or more embodiments, although not shown in FIG. 1, each node (e.g., 110, 122) of the container ecosystem 100 may be operatively connected to the API server 104, which may, at least in part, orchestrate the deployment of instances of containers on nodes.

In one or more embodiments, a container (e.g., 112, 124) may be configured to have a persistent volume (e.g., the persistent volume A 114, the persistent volume N 126). In one or more embodiments, a persistent volume is storage of any type that is configured to be associated with one or more instances of a container (e.g., 112, 124). A persistent volume (e.g., 114, 126) may be configured for a container (e.g., 112, 124) at the time of the initial configuration of the container, or added to the configuration of the container at a later time. A given container may have configured any number of associated persistent volumes without departing from the scope of embodiments disclosed herein. In one or more embodiments, a persistent volume (e.g., 114, 126) maybe a storage resource that stores data beyond the termination of a particular container instance with which the persistent volume is associated. In one or more embodiments, a request to configure a persistent volume for a container may be provided to the caching system controller 106, which may interact with one or more caching system plugins (discussed further below) to provide a persistent volume to an instance of a container.

In one or more embodiments, all or any portion of the nodes (e.g., 110, 122) of the container ecosystem 100 may include a caching system plugin (e.g., the caching system plugin A 116, the caching system plugin N 128). In one or more embodiments, a caching system plugin (116, 128) is any hardware, software, firmware, or any combination thereof configured to interact with the caching system controller 106 to service requests to provide persistent volumes (e.g., 114, 126) for instances of containers (e.g., 112, 124). In one or more embodiments, a caching system plugin (e.g., 116, 128) executes on a node (e.g., 110, 122) of the container ecosystem 100. In one or more embodiments, each caching system plugin (e.g., 116, 128) is operatively connected to the caching system controller 106.

In one or more embodiments, nodes (e.g., 110, 122) of the container ecosystem 100 include a local storage device (e.g., the local storage device A 120 of the node A 110, the local storage device N 132 of the node N 122). A local storage device (e.g., 120, 132) may be a storage device of any type that is local to the node. In one or more embodiments, a local storage device is a higher performance type of storage relative to other storage devices available to nodes. As an example, a local storage device (e.g., 120, 132) may be a persistent memory device, a flash storage device, etc. that has higher performance than other storage devices (e.g., hard disk drives) available to a node. Although FIG. 1 shows the nodes (110, 122) as each including a single local storage device (120, 132), a node may include any number of local storage devices without departing from the scope of embodiments disclosed herein.

In one or more embodiments, the container ecosystem 100 includes the remote storage device 134. The remote storage device 134 may be a storage device of any type (e.g., iSCSI storage, fibre channel storage, a NAS device, etc.) that is configures to be remotely accessible (e.g., over a network) to nodes (e.g., 110, 122) of the container ecosystem 100. The remote storage device 134 may be operatively connected to all or any portion of the nodes (e.g., 110, 122) of the container ecosystem 100. Although FIG. 1 shows the container ecosystem 100 as including a single remote storage device 134, the container ecosystem 100 may include any number of remote storage devices without departing from the scope of embodiments disclosed herein.

In one or more embodiments, the caching system plugin (e.g., 116, 128) is configured to receive requests to create persistent volumes for instances of containers (e.g., 112, 124). In one or more embodiments, in response to receiving such a request from the caching system controller 106, a caching system plugin (e.g., 116, 128) is configured to create two volumes; one on the local storage device (e.g., 120, 132) of the node on which the caching system plugin executes that will serve as a cache for the persistent volume, and another on the remote storage device 134. The two volumes may each be all or any portion of the storage available on the respective devices. The size of the volumes may be specified in the request received from the caching system controller 106

In one or more embodiments, the nodes (e.g., 110, 122) of the container ecosystem 100 include a cache manager (e.g., the cache manager A 118, the cache manager N 130). In one or more embodiments, a cache manager (e.g., 118, 130) is any hardware, software, firmware, or any combination thereof that is configured to manage, at least in part, storage to be used as persistent volumes for instances of containers that implement caching. One example of a cache manager is Open CAS. Other cache managers may be used without departing from the scope of embodiments disclosed herein. In one or more embodiments, a cache manager (e.g., 118, 130) is configured to receive information about volumes created by a caching system plugin (e.g., 116, 128) in order to create virtual block devices that encompass the volumes. As an example, a caching system plugin (e.g., 116, 128) may provide information about a volume created on a local storage device (e.g., 120, 132) to be used as cache storage and a volume created on the remote storage device 134 to be used as back-end storage. The cache manager (e.g., 118, 130) may then use the information to create a virtual block device, which is to be used by an instance of a container as a persistent volume (e.g., 114, 126). In one or more embodiments, information about the virtual block device may be provided from the cache manager (e.g., 118, 130) to the caching system plugin (e.g., 116, 128), which may, in turn, provide the information to the caching system controller 106 to be stored as part of the configuration information of the container in the container ecosystem data repository 108.

In one or more embodiments, a cache manager (e.g., 118, 130) is configured to implement a cache policy for the persistent volume that includes the volume on the local storage device as the cache, and the volume on the remote storage device as the back-end storage. In one or more embodiments, a cache policy determines what data corresponding to a container is cached in the cache volume, and when data is evicted from the cache volume or otherwise written to the remote storage volume. A cache policy may include a cache mode (e.g., write-through, write-back, write-around, write-invalidate, write-only, pass through, etc.) and a cache eviction algorithm (e.g., least recently used, least frequently used, first-in-first-out, most recently used, etc.). In one or more embodiments, read requests and write requests made by an instance of a container (e.g., 112, 124) to its associated persistent volume (e.g., 114, 126) are serviced by the cache manager (e.g., 118, 130) pursuant to the cache policy configured for the persistent volume. As an example, a write request may be made by a container (e.g., 112, 124) to write data to the persistent volume, and the cache manager (e.g., 118, 130), pursuant to a write-through cache mode of the cache policy, may write the data to both the cache (for fast retrieval if a read is requested) and to the back-end storage to more persistently store the data.

In one or more embodiments, the cache policy implemented for a persistent volume (e.g., 114, 116) may be selected by the caching system plugin (116, 128) and provided to the cache manager (118, 130). In one or more embodiments, the cache policy for a persistent volume (114, 126) is selected by the caching system plugin (e.g., 116, 128) and implemented by the cache manager (118, 130) at the time of the creation of a persistent volume for a container (e.g., 112, 124).

In one or more embodiments, a cache manager (e.g., 118, 130) is configured to monitor the I/O behavior of instances of containers (e.g., 112, 124) executing on a node (e.g., 110, 122). In one or more embodiments, the information about the I/O behavior of container instances may be added to historical data of I/O behavior for other instances of the same or similar containers. In one or more embodiments, such historical data is available to caching system plugins (e.g., 116, 128) for use when the caching system plugin is selecting a cache policy for a persistent volume of a container instance. As an example, when a container is being deployed for the first time, the historical data may include information that relates a type of application (e.g., a database application) to an expected I/O pattern for such an application (e.g., more writes than reads). In one or more embodiments, such information is used by the policy optimizer to select an initial cache policy for the container application instance being deployed on the host. In one or more embodiments, various types of applications implemented in container instances may be associated by default with particular cache policies.

In one or more embodiments, over time, the I/O behavior data for container instances (provided be cache managers) is added to the historical data for a particular type of container (e.g., same or similar applications to be deployed as container instances), and as new instances of containers are deployed, the caching system plugin (e.g., 116, 128) may re-assess the updated historical data to select a cache policy for a persistent volume of a new instance of a container, which may be different than the cache policy used for an initial deployment of an instance of the container and associated persistent volume. The historical data for a particular type of container may be stored globally within the container ecosystem 100, and made available to caching system plugins (e.g., 116, 128) when the caching system plugins are selecting cache policies to apply for persistent volumes (e.g., 114, 126) of instances of containers (e.g., 112, 124).

While FIG. 1 shows a particular configuration of components, other configurations may be used without departing from the scope of embodiments described herein. For example, although FIG. 1 shows certain components as part of the same device, any of the components may be grouped in sets of one or more components which may exist and execute as part of any number of separate and operatively connected devices. As another example, a single component may be configured to perform all, or any portion of the functionality performed by the components shown in FIG. 1. Accordingly, embodiments disclosed herein should not be limited to the configuration of components shown in FIG. 1.

Figure 2:
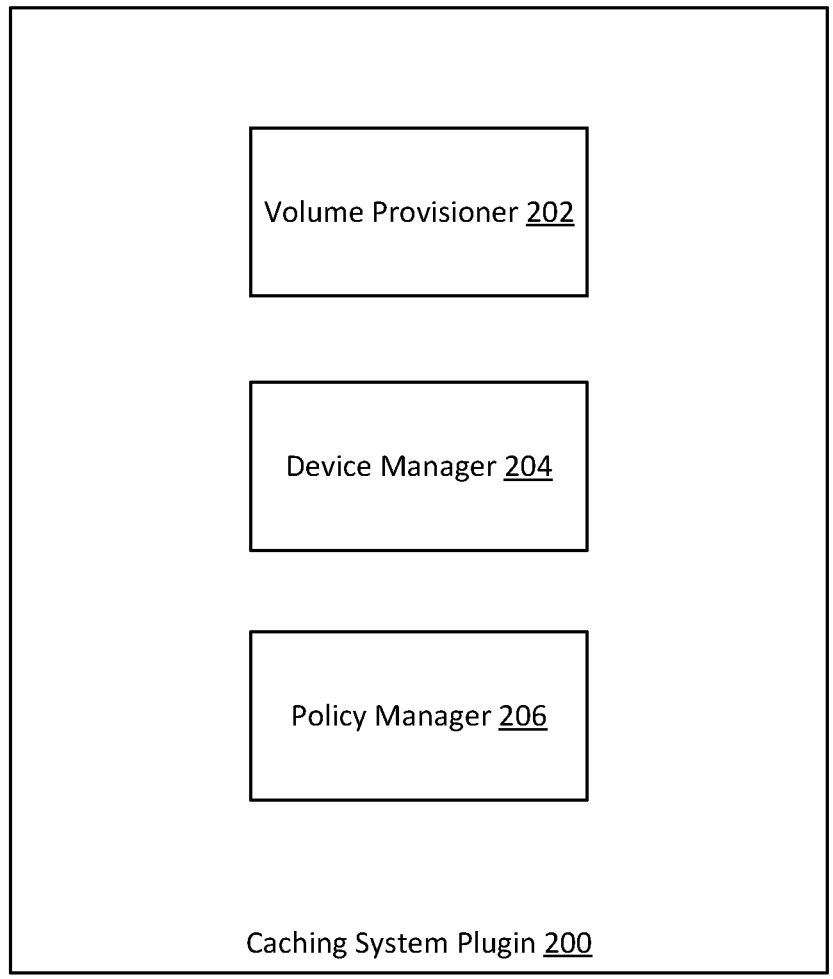
FIG. 2 illustrates a block diagram of an example caching system plugin in accordance with one or more embodiments disclosed herein.

FIG. 2 illustrates a block diagram of an example caching system plugin in accordance with one or more embodiments disclosed herein. As shown in FIG. 1, the caching system plugin 200 includes a volume provisioner 202, a device manager 204, and a policy manager 206. Each of these components is described below.

In one or more embodiments, the caching system plugin 200 is the same or substantially similar to the caching system plugin A 116 and/or the caching system plugin N 128 shown in FIG. 1 and described above.

In one or more embodiments, the caching system plugin 200 includes the volume provisioner 202. In one or more embodiments, the volume provisioner 202 is any hardware, software, firmware, or any combination thereof that is configured to provision storage volumes on storage devices. As an example, when the caching system plugin 200 receives a request to create a cache-enabled persistent volume for an instance of a container from a caching system controller (e.g., the caching system controller 106 shown in FIG. 1 and described above), the volume provisioner 202 may begin to service the request by provisioning a volume on a local storage device (e.g., the local storage devices 120 and 132 shown in FIG. 1 and described above) to function as a cache for the persistent volume and another volume on a remote storage device (e.g., the remote storage device 134 shown in FIG. 1 and described above) to function as the back-end storage of the persistent volume. Although FIG. 2 shows the caching system plugin 200 as including only a single volume provisioner 202, the caching system plugin may include any number of volume provisioners without departing from the scope of embodiments disclosed herein. As an example, there may be separate volume provisioners for certain types of storage devices (e.g., one volume provisioner for the local storage device, a second volume provisioner for iSCSI storage devices, etc.)

In one or more embodiments, the caching system plugin 200 includes a policy manager 206. In one or more embodiments, the policy manager 206 is any hardware, software, firmware, or any combination thereof that is configured to select a cache policy for persistent volumes being configured by for containers by the cache system plugin 200. In one or more embodiments, the policy manager 206 includes or otherwise has access to historical data about I/O behavior of container applications. In one or more embodiments, the policy manager 206 is configured to select an initial cache policy for a persistent volume when an instance of a particular container is being deployed for the first time.

As an example, the container may be for a particular type of application, and the application may be associated with an expected I/O behavior. In such a scenario, the policy manager 206 may select a cache policy for the persistent volume that is associated with the expected I/O behavior of the application type being deployed in the container instance. In one or more embodiments, as historical data for I/O behavior of container instances in a container ecosystem (e.g., the container ecosystem shown in FIG. 1) is augmented by I/O behaviors observed by cache managers (e.g., the cache manager A 118 and the cache manager N 130 shown in FIG. 1) of a container ecosystem, the policy manager 206 may use the updated historical data to select appropriate cache policies for instances of containers being deployed. As an example, an initial cache policy for an instance of a container may be selected when the container is first deployed based on the type of application the container will execute. However, the actual I/O behavior of the container instance may be different than the expected I/O behavior. The actual I/O behavior is monitored by the cache manager and added to the historical data for the container, such that future deployments of the container may have a different cache policy selected by the policy manager for the container instance being deployed.

In one or more embodiments, the caching system plugin includes a device manager 204. In one or more embodiments, the device manager 204 is any hardware, software, firmware, or any combination thereof that is configured to obtain volume information from the volume provisioner 202, cache policy selections from the policy manager 206, and to communicate with a cache manager to instantiate a persistent volume for an instance of a container being deployed on a node. In one or more embodiments, the device manager provides the aforementioned information to the cache manager so that the cache manager may create a virtual block device to provide the persistent volume for the container instance, and to apply the cache policy as the container instance writes to and reads from the persistent volume. In one or more embodiments, the device manager 204 is configured to provide information about the persistent volume back to the caching system controller to be stored as part of the configuration information for the container instance (e.g., in the container ecosystem data repository 108 shown in FIG. 1).

Figure 3:
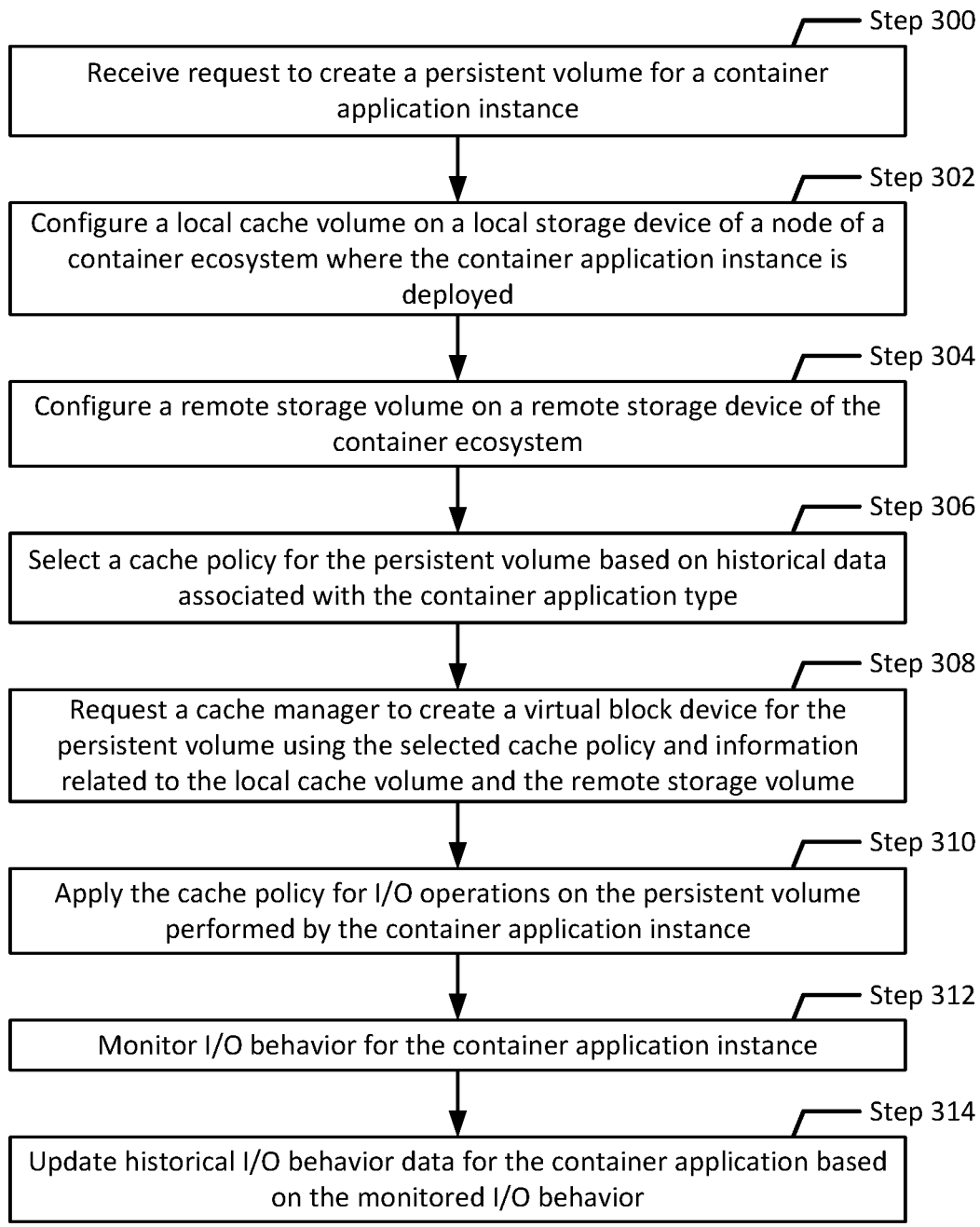
FIG. 3 illustrates an overview of an example method for creating a cache-enabled persistent volume for a container application instance in accordance with one or more embodiments disclosed herein.

FIG. 3 illustrates an overview of an example method for creating a cache-enabled persistent volume for a container application instance in accordance with one or more embodiments disclosed herein. The method may be performed, at least in part, by various components of a container ecosystem (e.g., the container ecosystem 100 shown in FIG. 1), such as a caching system controller (e.g., the caching system controller 106 shown in FIG. 1), a caching system plugin (e.g., the caching system plugins 116 and 128 shown in FIG. 1 or the caching system plugin 200 shown in FIG. 2, and/or a cache manager (e.g., the cache managers 118 and 130 shown in FIG. 1).

While the various steps in the flowchart shown in FIG. 3 are presented and described sequentially, some or all of the steps may be executed in different orders, some or all of the steps may be combined or omitted, and some or all of the steps may be executed in parallel with other steps of FIG. 3.

In Step 300, the method includes receiving a request to create a persistent volume for a container application instance. The request may be received by a caching system plugin from a caching system controller. As an example, a user may interact with an API server of a container platform to request deployment of a container application with a persistent volume. The API server may send a request to the caching system controller to create the persistent volume for an instance of the container application. The caching system controller may then identify a node in a container ecosystem on which the container application instance will be deployed, and request that a caching system plugin executing on the identified node create the persistent volume for the container application instance. The request may specify any relevant information related to the persistent volume (e.g., a desired storage size of the persistent volume).

In Step 302, the method includes configuring a local cache volume on a local storage device (e.g., the local storage device A 120 shown in FIG. 1) of a node (e.g., the node A 110 shown in FIG. 1) in a container ecosystem (e.g., the container ecosystem 100 shown in FIG. 1) where the container application instance (e.g., the container A 112 shown in FIG. 1) is or will be deployed. In one or more embodiments, in response to the request received in Step 300 by the caching system plugin, a volume provisioner (e.g., the volume provisioner 202 shown in FIG. 2) of the caching system plugin (e.g., the caching system plugin 200 shown in FIG. 2) provisions a volume on a local storage device of the node to serve as a cache for the persistent volume. The local cache volume may be all or any portion of the storage available on the local storage device. In one or more embodiments, the local storage device is a higher performance storage device, such as, for example, a persistent memory device (e.g., an Intel® Optane™ DC PMem device), a flash storage device, etc.

In Step 304, the method includes configuring a remote storage volume on a remote storage device. In one or more embodiments, the remote storage volume serves as a back-end storage volume of the persistent volume. The remote storage volume may be all or any portion of the storage space available on the remote storage device. The remote storage volume may be configured on a single remote storage device, or may be a logical volume on any number of remote storage devices. The one or more remote storage devices may be storage devices of any type. In one or more embodiments, the remote storage device on which the remote storage volume is configured is operatively connected (e.g., via a network) to the node on which the container application instance for which the persistent volume is being configured is deployed.

In Step 306, the method includes selecting a cache policy for the persistent volume based on historical data associated with the container application type. In one or more embodiments, the cache policy is selected by a policy manager (e.g., the policy manager 206 shown in FIG. 2) of a caching system plugin. In one or more embodiments, a cache policy determines what data corresponding to a container is cached in the local cache volume, and when data is evicted from the cache volume or otherwise written to the remote storage volume. A cache policy may include a cache mode (e.g., write-through, write-back, write-around, write-invalidate, write-only, pass through, etc.), a cache eviction algorithm (e.g., least recently used, least frequently used, first-in-first-out, most recently used, etc.), and a container termination plan (e.g., flush data from the cache volume to the remote storage volume upon container instance termination). Certain types of applications may generally exhibit certain types of I/O behavior. Thus, when a container application instance is being deployed for the first time, and there is not yet a large amount of historical data regarding the I/O behavior that instances of the container application will perform, the policy manager may be configured to select a cache policy that is appropriate for the expected I/O behavior of the application type of the container application. However, as I/O behavior of instances of the container application is observed (e.g., by the cache manager A 118 shown in FIG. 1), and the observed I/O behavior is added to the historical data about I/O behavior corresponding to the container application, the appropriate cache policy may be different than the initial cache policy that was applied for the initial deployment of the container application. In one or more embodiments, each time an instance of a container application is deployed on a node in a container ecosystem, the policy manager of the caching system plugin may assess the historical I/O behavior data corresponding to the container application, and select the most appropriate caching policy for such I/O behavior.

In Step 308, the method includes requesting a cache manager to create a virtual block device using information related to the local cache volume created in Step 302 and the remote storage volume created in Step 304, and the cache policy selected in Step 306. In one or more embodiments, the request is made by a device manager (e.g., the device manager 204 shown in FIG. 2) of a caching system plugin. In one or more embodiments, the virtual block device encompasses the two volumes, and is provided to the container application instance as a persistent volume, and the selected cache policy is applied by the cache manager for I/O operations on the persistent volume from the container application instance. In one or more embodiments, information related to the virtual block device is provided back to the caching system plugin, which may then relay the information to the caching system controller. The caching system controller may then store the information as part of the configuration information associated with the container application instance (e.g., in the container ecosystem data repository 108 shown in FIG. 1).

In Step 310, the method includes applying the cache policy for I/O operations on the persistent volume. In one or more embodiments, the container application instance writes data to and reads data from the persistent volume. In one or more embodiments, as the reads and writes are performed, the cache manager writes data to the local cache volume and/or the remote storage volume based on the cache policy, and reads are performed by checking for the requested data in the cache. In one or more embodiments, if the data is present in the cache, the data is read from the cache, otherwise the data is read from the remote storage volume. Thus, in one or more embodiments, the performance of the container application using the persistent volume is improved, as I/O operations using the local cache volume may be performed without incurring the latency overhead associated with I/O operations to the remote storage volume. At the same time, in one or more embodiments, the data is ultimately stored on the remote storage volume, persists even after the container application instance is terminated, and, because the remote storage volume is accessible by other nodes in the container ecosystem, the data may be accessed by other instances of the container application, even when deployed on other nodes.

In Step 312, the method includes monitoring the I/O behavior for the container application instance. In one or more embodiments, a cache manager monitors the I/O behavior of the container application instance. The cache manager may provide information related to the monitored I/O behavior to the caching system plugin.

In Step 314, the method includes updating the historical I/O behavior data for the container application instance based on the monitored I/O behavior information. In one or more embodiments, the updated historical I/O behavior information may then be used by caching system plugin policy managers when other instances of the container application, or similar container applications are deployed in order to select an appropriate cache policy for the new instance of the container application.

Figure 4:
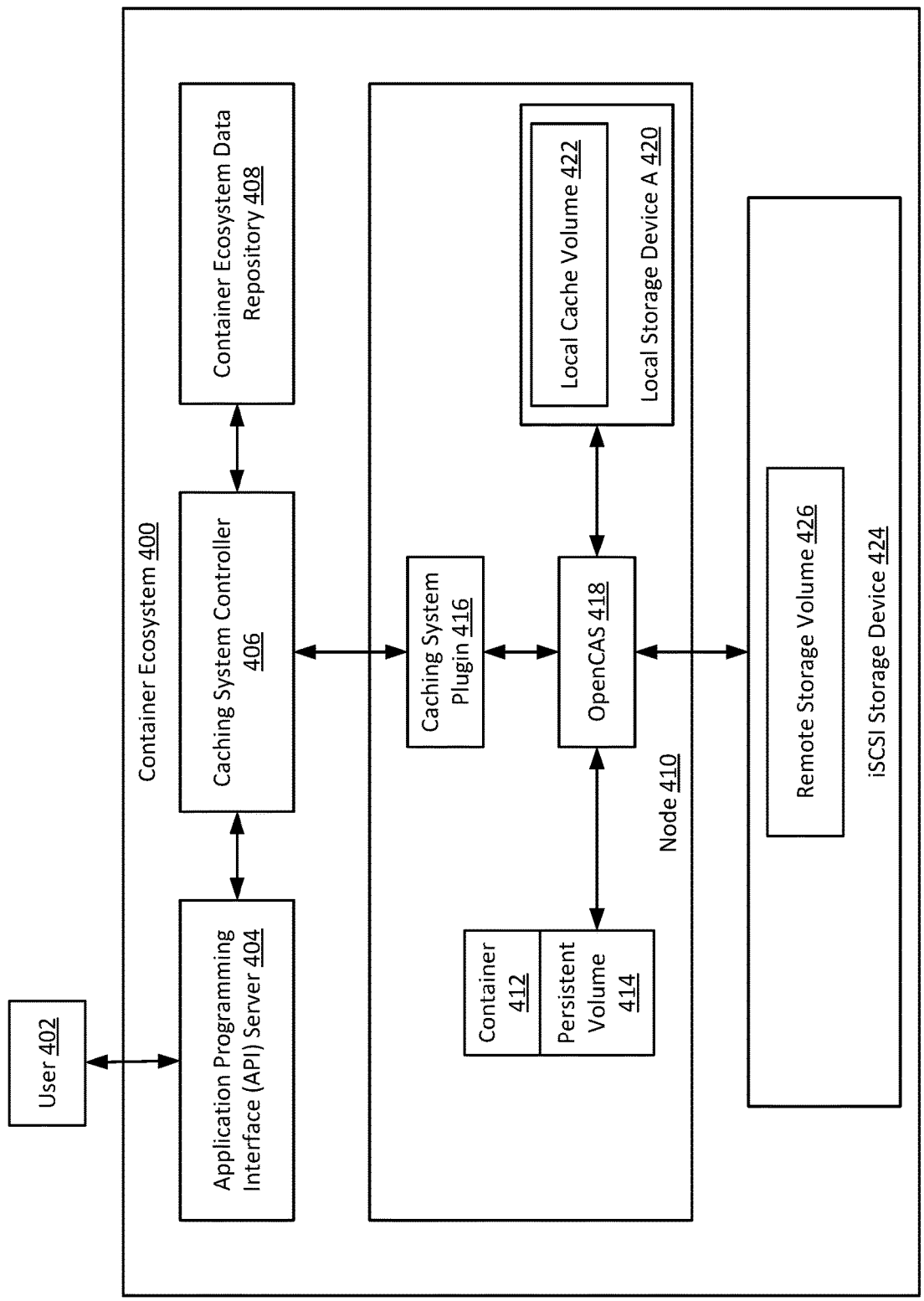
FIG. 4 illustrates an example scenario for deploying an instance of a container application with a persistent volume, in accordance with one or more embodiments of this disclosure.

FIG. 4 illustrates an example scenario for deploying an instance of a container application with a persistent volume, in accordance with one or more embodiments of this disclosure. The example shown in FIG. 4 and discussed below is a highly simplified example intended for explanatory purposes only, and not intended to limit the scope of embodiments described herein. One of ordinary skill in the art, having the benefit of this disclosure, will appreciate that such a scenario may include many more nodes, containers, storage devices, etc. than what is shown in FIG. 4. Additionally, while the example shows certain aspects of embodiments described herein, all possible aspects of such embodiments may not be illustrated in this particular example.

Consider a scenario in which a user 402 seeks to deploy an instance of a container with a persistent volume. The user interacts with an API server 404 of a container ecosystem 400. The API server 404 parses the request, and determines that it includes a request for a persistent volume. The API server 404 requests a caching system controller 406 configure the persistent volume.

The caching system controller 406 determines that an instance of the container is to be deployed on a node 410 of the container ecosystem 400. Therefore, the caching system controller 406 sends a request to a caching system plugin 416 executing on the node 410 to configure the persistent volume for a container 412.

The caching system plugin 416 includes a volume provisioner, which provisions a local cache volume 422 on a local storage device 420 of the node 410. The volume provisioner also provisions a remote storage volume 426 on an iSCSI storage device 424 that is accessible to the node 410 via a network.

The caching system plugin 416 also includes a policy manager. The policy manager obtains historical I/O behavior data related to the container application being deployed, and, based on the historical I/O behavior information, selects an appropriate cache policy for the persistent volume.

The caching system plugin 416 also includes a device manager, which interacts with OpenCAS 418 using a command line interface to request that a virtual block device be created corresponding to the local cache volume 422 and the remote storage volume 426, which is then provided to the container 412 as a persistent volume 414. The device manager also has OpenCAS 418 apply the selected cache policy for the persistent volume 414. Information corresponding to the persistent volume is then provided from the caching system plugin 416 to the caching system controller 406, which stores the information in a container ecosystem data repository 408.

The container 412 begins performing I/O operations on the persistent volume 414. OpenCAS applies the selected cache policy for the I/O operations, and also monitors the I/O behavior of the container 412. Information about the I/O behavior is added to historical I/O behavior information about the container application of which the container 412 is an instance.

Some time later, the container 412 is terminated. At this point, any data from the local cache volume that has not yet been written to the remote storage volume 426 is written to the remote storage volume 426. The next time an instance of the container application is deployed in the container ecosystem 400, the updated historical I/O behavior data is assessed by a policy manager of a caching system plugin, and a cache policy is selected, which may be different than the cache policy that was selected for the container 412.

Figure 5:
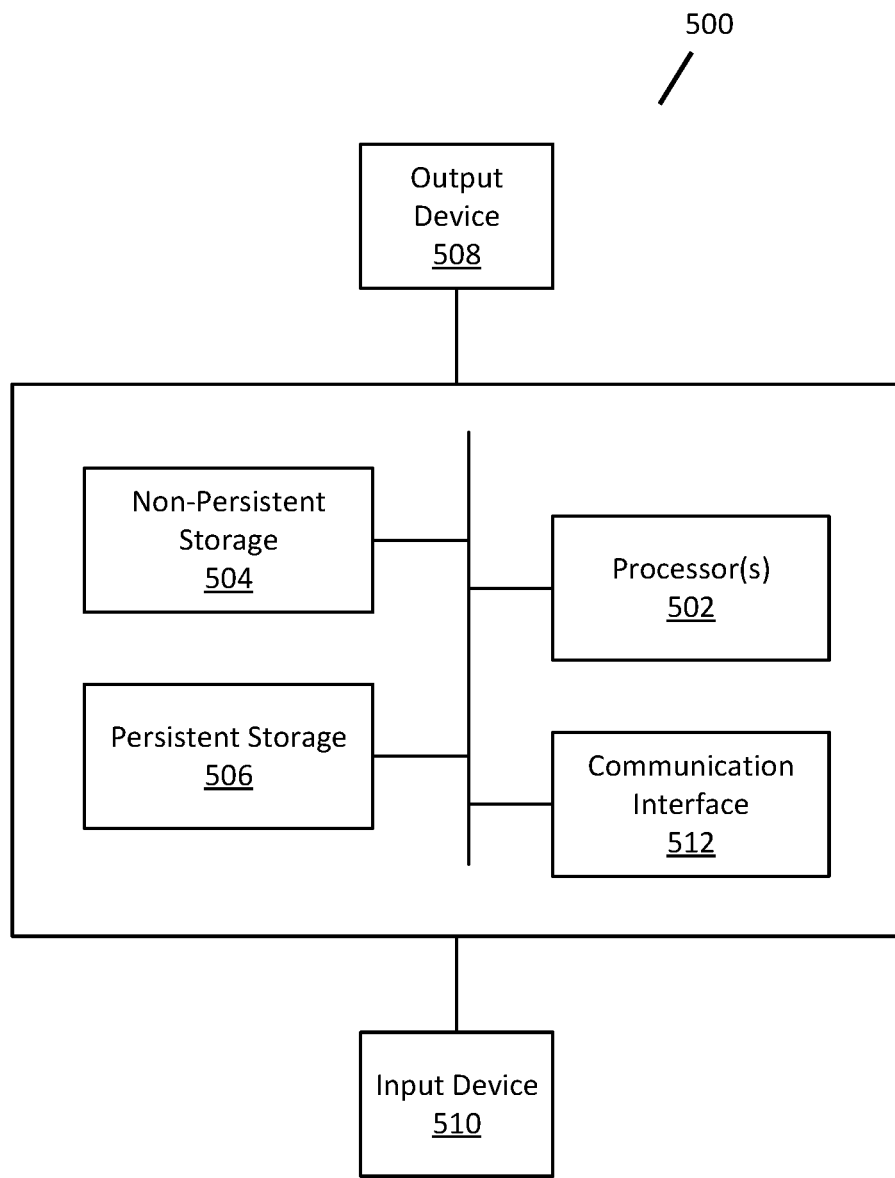
FIG. 5 illustrates a block diagram of a computing device, in accordance with one or more embodiments of this disclosure.

FIG. 5 illustrates a block diagram of a computing device, in accordance with one or more embodiments of this disclosure. As discussed above, embodiments described herein may be implemented using computing devices. For example, all or any portion of the components shown in FIG. 1 may be implemented, at least in part, using one or more computing devices. The computing device 500 may include one or more computer processors 502, non-persistent storage 504 (e.g., volatile memory, such as random access memory (RAM), cache memory, etc.), persistent storage 506 (e.g., a hard disk, an optical drive such as a compact disk (CD) drive or digital versatile disk (DVD) drive, a flash memory, etc.), a communication interface 512 (e.g., Bluetooth interface, infrared interface, network interface, optical interface, etc.), input devices 510, output devices 508, and numerous other elements (not shown) and functionalities. Each of these components is described below.

In one or more embodiments, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. Although only one processor 502 is shown in FIG. 5, the computing device 500 may include any number of processors without departing from the scope of embodiments disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more embodiments, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory, or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples of embodiments described herein. It will be understood by those skilled in the art (who also have the benefit of this Detailed Description) that one or more embodiments described herein may be practiced without these specific details, and that numerous variations or modifications may be possible without departing from the scope of the embodiments described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various embodiments described herein, may be equivalent to one or more same or similarly named and/or numbered components described with regard to any other figure. For brevity, descriptions of these components may not be repeated with regard to each figure. Thus, each and every embodiment of the components of each figure is incorporated by reference and assumed to be optionally present within every other figure having one or more same or similarly named and/or numbered components. Additionally, in accordance with various embodiments described herein, any description of the components of a figure is to be interpreted as an optional embodiment, which may be implemented in addition to, in conjunction with, or in place of the embodiments described with regard to a corresponding one or more same or similarly named and/or numbered component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A system, comprising:
one or more processors; and
one or more non-transitory computer readable media storing instructions which, when executed by the one or more processors, cause the one or more processors to:
receive, at a caching system plugin on a host computing device and from a caching system controller of a control plane of a container ecosystem, a request to create a persistent volume for a container application instance to be deployed on the host computing device;
configure, in response to the request, a local cache volume on the host computing device on which the container application instance is deployed, wherein the local cache volume is configured specifically to be first portion of the persistent volume for the container application instance;
configure, in response to the request, a remote storage volume on a remote storage device, wherein the remote storage volume is configured specifically to be a second portion of the persistent volume for the container application instance;
select a cache policy for the container application instance;
create a virtual block device associated with the local cache volume on the host computing device, the remote storage volume on the remote storage device, and the cache policy, wherein the virtual block device including the local cache volume and the remote storage volume is provided to the container application instance as the persistent volume; and
provide the virtual block device for use by the container application instance as the persistent volume.

2. The system of claim 1, wherein:
the caching system plugin executes on the host computing device,
wherein the host computing device is a node of the container ecosystem, and
the caching system controller executes in the control plane of the container ecosystem.

3. The system of claim 1, wherein the instructions, when executed by the one or more processors, further cause the one or more processors to:
perform input/output (I/O) operations of the container application instance on the persistent volume pursuant to the cache policy.

4. The system of claim 1, wherein the instructions, when executed by the one or more processors, further cause the one or more processors to:
monitor input/output (I/O) behavior of the container application instance; and
provide the monitored I/O behavior to the caching system controller for updating historical I/O behavior data for a container application corresponding to the container application instance.

5. The system of claim 1, wherein the instructions, when executed by the one or more processors, further cause the one or more processors to:
provide information related to the virtual block device to the caching system controller to be stored as configuration information related to the container application instance.

6. The system of claim 1, wherein the cache policy comprises a cache mode and an eviction algorithm.

7. A computer-implemented method, comprising:
receiving, by a caching system plugin on a host computing device and from a caching system controller of a control plane of a container ecosystem, a request to create a persistent volume for a container application instance to be deployed on the host computing device;
configuring, by the caching system plugin and in response to the request, a local cache volume on the host computing device on which the container application instance is deployed, wherein the local cache volume is configured specifically to be first portion of the persistent volume for the container application instance;
configuring, by the caching system plugin and in response to the request, a remote storage volume on a remote storage device, wherein the remote storage volume is configured specifically to be a second portion of the persistent volume for the container application instance;
selecting, by a policy manager of the caching system plugin, a cache policy for the container application instance;
creating, by the caching system plugin and from a cache manager, a virtual block device associated with the local cache volume on the host computing device, the remote storage volume on the remote storage device, and the cache policy, wherein the virtual block device including the local cache volume and the remote storage volume is provided to the container application instance as the persistent volume; and
providing the virtual block device for use by the container application instance as the persistent volume.

8. The computer-implemented method of claim 7, wherein:
the caching system plugin executes on the host computing device,
the host computing device is a node of the container ecosystem, and
the caching system controller executes in the control plane of the container ecosystem.

9. The computer-implemented method of claim 7, further comprising:
performing input/output (I/O) operations of the container application instance on the persistent volume pursuant to the cache policy.

10. The computer-implemented method of claim 7, further comprising:
monitoring input/output (I/O) behavior of the container application instance; and
providing the monitored I/O behavior to the caching system controller for updating historical I/O behavior data for a container application corresponding to the container application instance.

11. The computer-implemented method of claim 7, further comprising:
providing information related to the virtual block device to the caching system controller to be stored as configuration information related to the container application instance.

12. The computer-implemented method of claim 7, wherein the cache policy comprises a cache mode and an eviction algorithm.

13. A non-transitory computer-readable medium storing programming for execution by one or more processors, the programming comprising instructions to:
receive, at a caching system plugin on a host computing device and from a caching system controller of a control plane of a container ecosystem, a request to create a persistent volume for a container application instance to be deployed on the host computing device;

configure, in response to the request, a local cache volume on the host computing device on which the container application instance is deployed, wherein the local cache volume is configured specifically to be first portion of the persistent volume for the container application instance;

configure, in response to the request, a remote storage volume on a remote storage device, wherein the remote storage volume is configured specifically to be a second portion of the persistent volume for the container application instance;

select a cache policy for the container application instance;

create a virtual block device associated with the local cache volume on the host computing device, the remote storage volume on the remote storage device, and the cache policy, wherein the virtual block device including the local cache volume and the remote storage volume is provided to the container application instance as the persistent volume; and provide the virtual block device for use by the container application instance as the persistent volume.

14. The non-transitory computer-readable medium of claim 13, wherein:

the caching system plugin executes on the host computing device, the host computing device is a node of the container ecosystem, and the caching system controller executes in the control plane of the container ecosystem.

15. The non-transitory computer-readable medium of claim 13, wherein the programming comprises further instructions to:

perform input/output (I/O) operations of the container application instance on the persistent volume pursuant to the cache policy.

16. The non-transitory computer-readable medium of claim 13, wherein the programming comprises further instructions to:

monitor input/output (I/O) behavior of the container application instance; and provide the monitored I/O behavior to the caching system controller for updating historical I/O behavior data for a container application corresponding to the container application instance.

17. The non-transitory computer-readable medium of claim 13, wherein the programming comprises further instructions to:

provide information related to the virtual block device to the caching system controller to be stored as configuration information related to the container application instance.

* * * * *